April 12, 1966  R. S. MANLY  3,245,703
QUICK DETACHABLE PIPE COUPLING
Filed Oct. 28, 1963

INVENTOR.
ROBERT S. MANLY
BY Naylor & Neal
ATTORNEYS

United States Patent Office 3,245,703
Patented Apr. 12, 1966

3,245,703
QUICK DETACHABLE PIPE COUPLING
Robert S. Manly, 924 Gibson Ave., Eureka, Calif.
Filed Oct. 28, 1963, Ser. No. 319,416
2 Claims. (Cl. 285—319)

This invention relates to quick detachable couplings for garden hoses, oxygen lines, and the like.

In accordance with this invention I have provided a new quick detachable coupling which is very efficient in connecting together garden hoses and relatively high pressure irrigation conduits and oxygen lines. The coupling may be detached very easily and is still very efficient in containing fluids at relatively high pressures. Additionally, the coupling is extremely simple to manufacture and may be manufactured very economically in comparison with devices available on the market at the present time for such purposes.

These features are obtained by providing male and female coupling members which have interfitting neck and passageway portions where the passageway in the female member has the shape of a constant diameter cylinder along which fluid sealing is effected. The diameter of the passageway is slightly greater than the diameter of the neck, and a resilient O-ring is seated in a groove in the neck and has an uncompressed maximum diameter which is greater than the diameter of the cylindrical passageway. The male and female members are locked together by means of resilient latch fingers on the male member which have latching elements received in an interior annular recess in the female member.

The provision of an O-ring seal along the cylindrical surface of the passageway in the female member permits effective sealing even while the male and female members are moved longitudinally with respect to each other. In this way, the depth of insertion of the male member into the female member is not critical, and the latching means can incorporate axial motion features. In this regard, the coupling of my invention preferably employs inclined latches on the fingers of the male member which cooperate with an inclined or frusto-conical surface in the annular recess of the female member so that the latching means is positively urged into firmer latching engagement by fluid pressure within the coupling.

Additionally, the provision of fluid sealing engagement along a cylindrical surface as mentioned above, permits greater ease of manufacture of the coupling and eliminates the requirement for close tolerance operations in manufacture.

The manufacture of the coupling is also very substantially simplified by construction of the male member of the coupling from two pieces which may be snapped into engagement with each other. In this two piece construction, the resilient fingers are formed as a separate element from the body of the male member and are mounted on a ring segment which extends around more than 180 degrees of the circumference of the male member so that the ring segment may be resiliently snapped into a peripheral groove on the male member. The latching engagement of inclined surfaces mentioned above may also be employed in providing firm latching between the ring segment and the body of the male member.

Other features and advantages of the invention will become apparent from the following description read in conjunction with the attached drawings in which.

Figure 1:
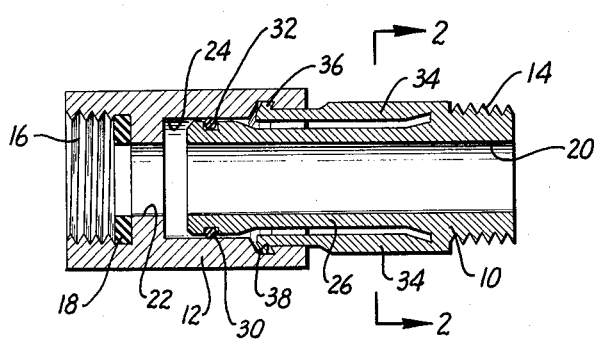
FIG. 1 is a longitudnal sectional view of a quick detachable coupling constructed in accordance with this invention.
Figure 2:
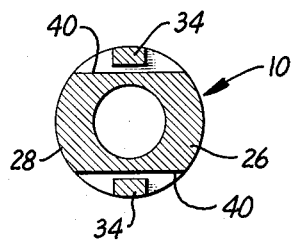
FIG. 2 is a cross-sectional view of the coupling of FIG. 1 taken along the plane indicated at 2—2 in FIG. 1.

Referring now in detail to the drawings and particularly to FIG. 1, the quick detachable coupling illustrated therein includes male and female body members 10 and 12 respectively which are externally and internally threaded at 14 and 16 respectively to receive the female and male ends of a garden hose. The female member carries a conventional sealing washer 18. The male and female members 10 and 12 are provided with interior passageways 20 and 22 respectively through which water is connected between two hose sections.

The female coupling member 12 is provided with an enlarged passageway portion 24 having the shape of a constant diameter cylinder and having a depth exceeding the depth of insertion of the male member into the female member so that accumulated foreign matter in the coupling member does not interfere with coupling and uncoupling. The male member 10 has a neck portion 26 having an outer cylindrical surface 28, and a resiliently compressible O-ring 30 is mounted in a peripheral groove 32 on the neck 26 adjacent to its free end (its end which is first inserted into the female member). The O-ring 30 has a minimum undeformed diameter less than the diameter of the recess 32 so that the O-ring resiliently grips the bottom surface of the groove 32, and with the O-ring 30 mounted in the recess 32, the O-ring has a maximum uncompressed diameter which is greater than the diameter of the cylindrical passageway portion 24 so that the O-ring is compressed into fluid sealing engagement with the female member when the male member is inserted therein.

Latching of the male and female members together is provided by means of a pair of resilient fingers 34 on the male member which have latch blades 36 on their free ends with the latch blades received in a peripheral annular recess 38 in the passageway 24 in the female coupling mem ber 12. The fingers 34 are preferably provided within axially extending recesses 40 in the neck 26 of the male member so that the fingers are contained within the overall profile of the male member and protected from damage and accidental release. The coupling members may be released by resiliently deforming the fingers 34 radially inwardly of the neck 26 to withdraw the blades 36 from the recess 38.

Extremely effective latching between the male and female members is provided by shaping the blades 36 so that they have inclined or hooked end portions as shown in FIG. 1 (and as shown at 42 in FIG. 3) which engage a frusto-conical surface of the recess 38 where the frusto-conical surface faces axially of the female body in a direction toward the bottom of the passageway portion 24. This inclined construction of the blades 36 and the frusto-conical surface of the recess 38 (illustrated at 44 in FIG. 3) causes the latch blades 36 to seek their latching positions responsive to the application of fluid pressure within the coupling.

The quick detachable coupling illustrated in FIG. 1 is particularly adapted for manufacture by injection molding or the like since the fingers 34 are integrally formed with the neck 26 of the male body and may be so integrally formed in a molding operation. The form of quick detachable coupling in FIG. 3 is also readily adapted for manufacture by injection molding, but may also be manufactured very efficiently by screw machines and the like.

Figure 3:
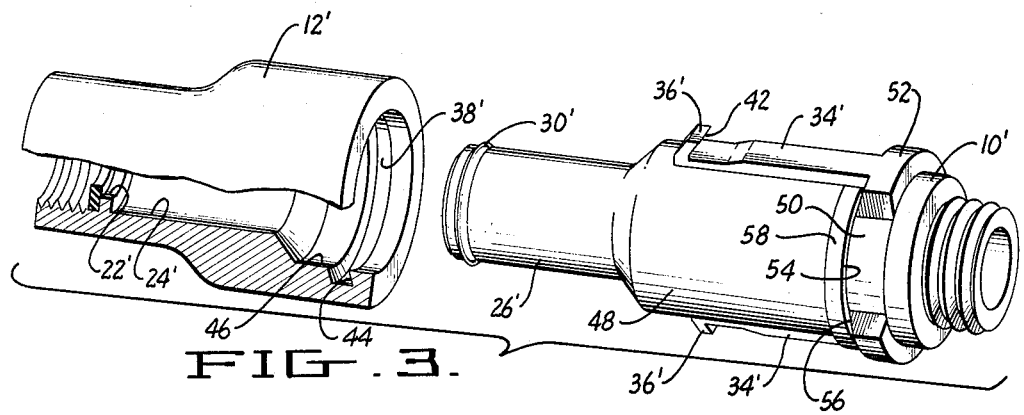
FIG. 3 is an exploded view of the preferred form of coupling member constructed in accordance with the invention.

In the coupling of FIG. 3, the interior arrangement in the female body 12′ is similar to that shown in FIG. 1 except that the annular recess 38' is provided in an enlarged portion 46 of the cylindrical recess portion 24'. The male member 10' is also provided with a corresponding large diameter portion 48 of the neck 26' which fits within the cylindrical area 46. The coupling of FIG. 3, however, differs substantially from that shown in FIG. 1 in that both the bodies 10 and 12 have circular cross-sections throughout their lengths so that they may be manufactured easily by screw machinery. In the coupling of FIG. 3, a peripheral groove 50 extends around the male member 10 and receives a resilient snap ring 52 on which the resilient fingers 34' are mounted. The snap ring 52 extends around more than 180 degrees of the periphery of the male body 10' so that the snap ring 52 resiliently holds itself in place. Additionally, the annular groove 50 is provided with a frusto-conical surface 54 which faces away from the free end of the neck 26' and which engages a frusto-conical surface 56 on the snap ring 52 by which the snap ring is urged into firmer locking engagement on the male body by fluid pressure within the coupling. An outwardly projecting flange 58 on the enlarged portion 48 of the male body 10' seats on the undersides of the fingers 34' so that the resiliency of the ring 52 in gripping the male body is effective to resiliently urge the latch blades 36' outwardly into the recess 38'.

Figure 4:
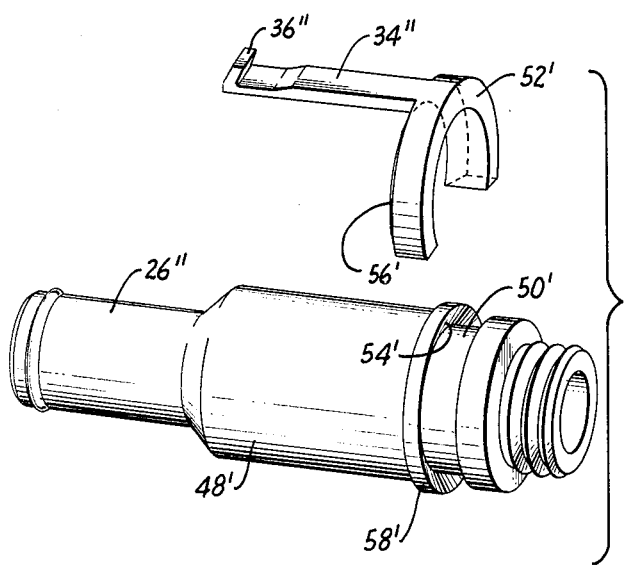
FIG. 4 is an exploded view of an alternative form of the male coupling member which is employed in the coupling of FIG. 3.

The male coupling member illustrated in FIG. 4 differs from that shown in FIG. 3 in that the snap ring member 52' in FIG. 4 carries only a single resilient finger 34''.

While certain specific embodiments of this invention have been illustrated and described in detail herein, it is obvious that many modifications thereof may be made without departing from the spirit and scope of the invention.

I claim:
1. A quick detachable coupling for hoses and the like comprising male and female bodies adapted to be connected to two hose lengths to be coupled,
   (A) said male body having
      (1) a neck portion at one end of said male body with said neck portion having an outer cylindrical surface of constant diameter and a peripheral groove surrounding said neck portion adjacent to the free end thereof,
      (2) an enlongated passageway extending completely through said male body generally coaxial with said neck portion,
      (3) a resilient O-ring mounted on said neck portion in said groove with said O-ring embracing the bottom of said groove and projecting above said outer cylindrical surface so that said O-ring has an uncompressed maximum diameter which is greater than the diameter of said cylindrical outer surface,
      (4) at least one resilient finger mounted on said male body and extending from said male body longitudinally thereof toward said free end of said neck portion with said finger having an outwardly projecting latch portion on its free end and being resiliently deformable radially inwardly of said body,
      (5) a second peripheral groove therein adjacent to the end of said male body opposite to said neck portion, and
      (6) a snap ring resiliently mounted in said second groove and extending around more than one-half of the periphery of said male body resiliently gripping said male body with said finger mounted on said snap ring and extending therefrom toward said neck, and
   (B) said female body having
      (1) an elongated passageway having a cylindrical portion of constant diameter with said neck portion of said male body received therein and with the diameter of said cylindrical portion of said passageway being throughout a substantial portion of the length of said female body greater than the diameter of said outer cylindrical surface and less than said uncompressed maximum diameter of said O-ring, and
      (2) an outwardly extending annular recess in said female body communicating with said passageway therein with said latch portion of said finger received in said recess and locking said bodies together with said latch portion movable out of said recess to an unlatching position responsive to radially inward movement of said latch portion when said finger is resiliently deformed.

2. The coupling of claim 1 in which said recess and second groove have surface portions thereof which have the shapes of frustums of cones the vertices of which are pointed toward the end of said female body remote from said male body, and said latch portion and said snap ring have surfaces thereof engaging said surface portions.

References Cited by the Examiner

UNITED STATES PATENTS

| 115,917 | 6/1871 | Wharton | 285—319 X |
| 198,402 | 12/1877 | Marsden | 285—319 X |
| 735,221 | 8/1903 | Dufford | 285—414 |
| 1,078,112 | 11/1913 | Storm | 285—347 X |
| 1,811,083 | 6/1931 | Hogan | 285—257 X |
| 1,815,407 | 7/1931 | Jones | 285—309 X |
| 1,966,718 | 7/1934 | Hanson | 285—313 |
| 2,144,834 | 1/1939 | DiCesare | 285—347 X |
| 2,727,761 | 12/1955 | Elliott | 285—83 |

CARL W. TOMLIN, *Primary Examiner.*